United States Patent
Kim (10) Patent No.: US 9,495,328 B2
(45) Date of Patent: Nov. 15, 2016

(54) METHOD FOR CHANGING A RECEIVING MODE IN A MOBILE TERMINAL TO A NON-VIBRATION MODE WHEN WIRELESSLY CHARGING

(75) Inventor: Min-Sung Kim, Guri-si (KR)

(73) Assignee: HANRIM POSTECH CO., LTD., Suwon-si (KR)

( * ) Notice: Subject to any disclaimer, the term of this patent is extended or adjusted under 35 U.S.C. 154(b) by 565 days.

(21) Appl. No.: 13/806,599

(22) PCT Filed: Jun. 13, 2011

(86) PCT No.: PCT/KR2011/004305
§ 371 (c)(1),
(2), (4) Date: Jan. 23, 2013

(87) PCT Pub. No.: WO2011/162497
PCT Pub. Date: Dec. 29, 2011

(65) Prior Publication Data
US 2013/0117552 A1 May 9, 2013

(30) Foreign Application Priority Data

Jun. 24, 2010 (KR) .................. 10-2010-0059903

(51) Int. Cl.
*G06F 1/26* (2006.01)
*H02J 7/00* (2006.01)
(Continued)

(52) U.S. Cl.
CPC ......... *G06F 15/7871* (2013.01); *H02J 7/0052* (2013.01); *H02J 7/025* (2013.01); *H04B 1/401* (2013.01); *H04B 5/0037* (2013.01);
(Continued)

(58) Field of Classification Search
CPC ........ G06F 1/26; G06F 1/266; G06F 1/1683; H02J 5/005; H02J 7/025; H02J 7/0044; H02J 7/0052; H04B 5/0037; H04B 1/401; H04M 1/72569; H04M 19/047
See application file for complete search history.

(56) References Cited

U.S. PATENT DOCUMENTS

| | | | |
|---|---|---|---|
| 6,271,764 B1 * | 8/2001 | Okamura ............ | H04M 19/041 340/407.1 |
| 7,469,155 B2 * | 12/2008 | Chu .................. | H04M 1/72569 455/456.1 |

(Continued)

FOREIGN PATENT DOCUMENTS

| | | |
|---|---|---|
| JP | 2001-197674 A | 7/2001 |
| KR | 10-1993-0007117 | 4/1993 |

(Continued)

OTHER PUBLICATIONS

International Search Report dated Feb. 15, 2012, issued in corresponding International Application No. PCT/KR2011/004305.
(Continued)

*Primary Examiner* — Thomas Lee
*Assistant Examiner* — Danny Chan
(74) *Attorney, Agent, or Firm* — Stein IP, LLC (57) ABSTRACT

Disclosed herein are a method of changing a receiving mode in a mobile terminal, and a mobile terminal thereof. The method includes entering a charging ready mode when the mobile terminal is positioned adjacent to an external wireless power transmitting module; determining whether the receiving mode of the mobile terminal is a vibration mode; and, when the receiving mode of the mobile terminal is the vibration mode, changing the receiving mode of the mobile terminal to a non-vibration mode.

9 Claims, 6 Drawing Sheets

(51) Int. Cl.
G06F 15/78 (2006.01)
H04M 19/04 (2006.01)
H04B 5/00 (2006.01)
H04M 1/725 (2006.01)
H04B 1/401 (2015.01)
H02J 7/02 (2016.01)
H02J 5/00 (2016.01)

(52) U.S. Cl.
CPC ......... *H04M1/72569* (2013.01); *H04M 19/04* (2013.01); *H04M 19/047* (2013.01); *H02J 5/005* (2013.01); *H02J 7/0044* (2013.01)

(56) References Cited

U.S. PATENT DOCUMENTS

2008/0188268 A1* 8/2008 Kim et al. ............... 455/566
2010/0194335 A1* 8/2010 Kirby et al. ............. 320/108
2010/0213895 A1* 8/2010 Keating et al. .......... 320/108
2012/0043932 A1* 2/2012 Nakama .................. 320/108

FOREIGN PATENT DOCUMENTS

| KR | 1993-0007117 A | 4/1993 |
| KR | 10-2003-0003622 | 1/2003 |
| KR | 10-2004-0028170 | 4/2004 |
| KR | 10-2004-0028170 A | 4/2004 |
| KR | 10-2004-0072869 | 8/2004 |

OTHER PUBLICATIONS

Korean Office Action dated Nov. 30, 2011, issued in corresponding Korean Patent Application No. 10-2010-0059903.
Chinese Office Action mailed Feb. 28, 2014, issued in corresponding Chinese Application No. 201180029274.8.
U.S. Appl. No. 14/042,063, filed Sep. 30, 2013, Chun-Kil Jung, Hanrim Postech Co., Ltd.
U.S. Appl. No. 14/074,489, filed Nov. 7, 2013, Chun-Kil Jung, Hanrim Postech Co., Ltd.
Chinese Office Action issued Sep. 15, 2014, to Chinese Application No. 201180029274.8.

* cited by examiner

METHOD FOR CHANGING A RECEIVING MODE IN A MOBILE TERMINAL TO A NON-VIBRATION MODE WHEN WIRELESSLY CHARGING

CROSS-REFERENCE TO RELATED APPLICATIONS

This application is a 35 U.S.C. §371 national stage of International Application PCT/KR2011/004305, filed Jun. 13, 2011, which claims the benefit of Korean Application No. 10-2010-0059903, filed Jun. 24, 2010 in the Korean Intellectual Property Office. The disclosures of both applications are incorporated herein by reference in their entirety.

BACKGROUND OF THE INVENTION

1. Field of the Invention

The present invention relates to a method of changing a receiving mode in a mobile terminal at the time of wireless charging, and a mobile terminal thereof.

2. Description of the Related Art

Terminals such as a personal computer, a laptop computer, a cellular phone, and the like, may be configured to perform various functions. Examples of these various functions include a data and audio communication function, a function of photographing a photograph or a moving image through a camera, an audio storing function, a function of playing a music file through a speaker system, a display function of an image or a video, and the like. Some terminals have an additional function of allowing a game to be executed, and other terminals are also implemented as multimedia devices. Further, a terminal may receive a broadcasting or multicast signal to view a video or a television program.

The industry continues to seek to improve and add functions of these terminals. The above-mentioned efforts include improvement of software or hardware as well as structural changes and improvement of terminal components.

Recently, in place of a method of charging a battery through a wired terminal, a contactless charging method has been developed.

SUMMARY OF THE INVENTION

Although not limited thereto, an object of the present invention is to provide a mobile terminal capable of more efficiently performing wireless charging by changing a receiving mode of the mobile terminal at the time of wireless charging.

While not limited thereto, according to an embodiment of the present invention, a method of changing a receiving mode in a mobile terminal may comprise entering a charging ready mode when the mobile terminal is positioned adjacent to an external wireless power transmitting module; determining whether the receiving mode of the mobile terminal is a vibration mode; and, when the receiving mode of the mobile terminal is the vibration mode, changing the receiving mode of the mobile terminal to a non-vibration mode.

According to an aspect of the invention, the positioning of the mobile terminal adjacent to the external wireless power transmitting module may comprise allowing a wireless charging receiving module of the mobile terminal to directly contact the wireless power transmitting module.

According to an aspect of the invention, the changing of the receiving mode of the mobile terminal from the vibration mode to the non-vibration mode may comprise presetting the non-vibration mode; and, when the receiving mode of the mobile terminal is the vibration mode, automatically changing the receiving mode of the mobile terminal to the preset non-vibration mode.

According to an aspect of the invention, the non-vibration mode may comprise any one of a silent mode, a sound mode, and a post-silent sound mode.

According to an aspect of the invention, the changing of the receiving mode of the mobile terminal from the vibration mode to the non-vibration mode may comprise displaying a mode change menu screen configured to change the receiving mode of the mobile terminal from the vibration mode to the non-vibration mode on a display unit; and changing the receiving mode of the mobile terminal from the vibration mode to the non-vibration mode using the mode change menu screen.

According to an aspect of the invention, the method may further comprise performing an alarm function when the receiving mode of the mobile terminal is the vibration mode.

According to an aspect of the invention, the method may further comprise resetting the receiving mode of the mobile terminal to the vibration mode when a battery of the mobile terminal is fully charged.

While not limited thereto, according to an embodiment of the present invention, a mobile terminal may comprise a wireless charging receiving module configured to receive a wireless power signal through an external wireless power transmitting module; a battery charged by the wireless power signal received through the wireless charging receiving module; a vibrating module configured to vibrate the mobile terminal at the time of generation of an event; and a controlling unit configured to determine whether a receiving mode of the mobile terminal is a vibration mode when the wireless charging receiving module is positioned adjacent to the external wireless power transmitting module, and, when the receiving mode of the mobile terminal is the vibration mode, to change the receiving mode of the mobile terminal to a non-vibration mode.

According to an aspect of the invention, the mobile terminal may further comprise a user input unit configured to preset the non-vibration mode.

According to an aspect of the invention, the non-vibration mode may comprise any one of a silent mode, a sound mode, and a post-silent sound mode.

According to an aspect of the invention, the mobile terminal may further comprise a display unit configured to display a mode change menu screen, the mode change menu screen configured to change the receiving mode of the mobile terminal from the vibration mode to the non-vibration mode, wherein the controlling unit displays the mode change menu screen on the display unit when the wireless charging receiving module is positioned adjacent to the external wireless power transmitting module.

According to an aspect of the invention, the mobile terminal may further comprise an alarm unit, wherein the controlling unit operates the alarm unit when the wireless charging receiving module is positioned adjacent to the external wireless power transmitting module and the receiving mode is the vibration mode.

According to an aspect of the invention, the controlling unit may reset the receiving mode of the mobile terminal to the vibration mode when a battery of the mobile terminal is fully charged.

According to an embodiment of the present invention having the above-described configuration, when the mobile terminal performs wireless charging, even though an event is generated, the mobile terminal may effectively perform the wireless charging.

In addition, the user is given an opportunity to change the receiving mode at the time of the wireless charging, such that the user may rapidly change the receiving mode as needed.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Hereinafter, a mobile terminal according to an embodiment of the present invention will be described in more detail with reference to the accompanying drawings, wherein like reference numerals refer to the like elements throughout. The embodiments are described below in order to explain the present invention by referring to the figures.

The terms "modules" and "units" for components used in the following description are used only for convenience and do not have specially important meanings or roles. Therefore, it is to be noted that the "module" and the "unit" may also be used interchangeably.

The mobile terminal may be implemented in various forms. For example, the mobile terminal described in the present description may be a cellular phone, a smart phone, a laptop computer, a digital broadcasting terminal, a personal digital assistant (PDA), a portable multimedia player (PMP), or a navigation device, among many other options. It will be easily understood by those skilled in the art that a configuration according to the following description may also be applied to a fixed terminal, modified with substitutions for or the absence of specially configured mobile components.

Figure 1:
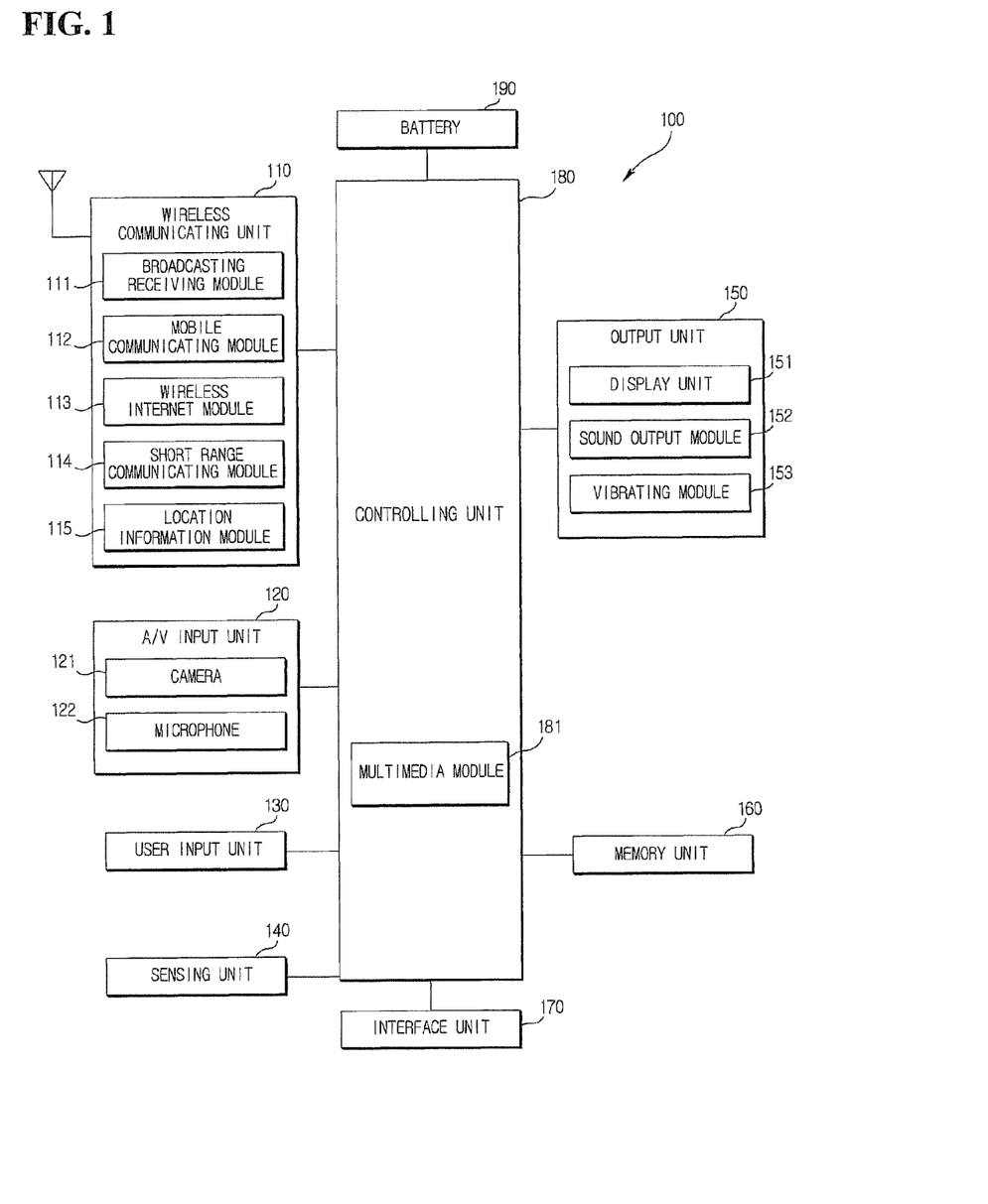
FIG. 1 is a block diagram of a mobile terminal, according to an embodiment of the present invention.

FIG. 1 is a block diagram of a mobile terminal according to an embodiment of the present invention.

According to the embodiment depicted in FIG. 1, the mobile terminal 100 may comprise a wireless communicating unit 110, an audio/video (A/V) input unit 120, a user input unit 130, a sensing unit 140, an output unit 150, a memory unit 160, an interface unit 170, a controlling unit 180, a battery 190, and the like. However, all of the components shown in FIG. 1 are not requisite components. The mobile terminal may be implemented using more or less than the components shown in FIG. 1.

Hereinafter, the components will be sequentially described.

The wireless communicating unit 110 may comprise one or more components allowing wireless communication between the mobile terminal 100 and a wireless communication system or network in which the mobile terminal 100 is located. For example, the wireless communicating unit 110 may comprise a broadcasting receiving module 111, a mobile communicating module 112, a wireless Internet module 113, a short range communicating module 114, a location information module 115, and the like.

The broadcasting receiving module 111 receives a broadcasting signal and/or broadcasting related information from an external broadcasting managing server through a broadcasting channel. The broadcasting channel may comprise a satellite channel and a terrestrial channel. The broadcasting managing server may be a server configured to generate and transmit a broadcasting signal and/or broadcasting related information, a server configured to receive a previously generated broadcasting signal, and/or a server configured to receive previously generated broadcasting related information to provide the previously generated broadcasting signal and/or the previously generated broadcasting related information to the terminal. The broadcasting related information may be information related to a broadcasting channel, a broadcasting program, and/or a broadcasting service provider. The broadcasting signal may comprise a broadcasting signal in a form in which a data broadcasting signal is combined with a television (TV) broadcasting signal or a radio broadcasting signal as well as the TV broadcasting signal, the radio broadcasting signal, and the data broadcasting signal.

Meanwhile, the broadcasting related information may also be provided through a mobile communication network. In this case, the broadcasting related information may be received by the mobile communicating module 112.

The broadcasting related information may be present in various forms. For example, the broadcasting related information may be present in a form such as an electronic program guide (EPG) of digital multimedia broadcasting (DMB), an electronic service guide (ESG) of digital video broadcast-handheld (DVB-H), or the like.

The broadcasting receiving module 111 may receive the broadcasting signals using various broadcasting systems. Particularly, the broadcasting receiving module 111 may receive digital broadcasting signals using a digital broadcasting system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), or the like. The broadcasting receiving module 111 is configured to be appropriate for all broadcasting systems providing the broadcasting signals as well as the above-mentioned digital broadcasting systems.

The broadcasting signal and/or the broadcasting related information received through the broadcasting receiving module 111 may be stored in the memory unit 160.

In addition, the mobile communicating module 112 transmits or receives wireless signals to or from at least one of a base station, an external terminal, and a server on a mobile communication network. Here, the wireless signal may comprise various types of data according to transmission or reception of a voice call signal, a video call signal, or a text/multimedia message.

The wireless Internet module 113, which indicates a module for a wireless Internet access, may be disposed at an inner portion or an outer portion of the wireless communicating unit 110. Possible wireless Internet technologies include but are not limited to a wireless LAN (WLAN) (Wi-Fi) technology, a wireless broadband (VVibro) technology, a world interoperability for microwave access (Wimax) technology, a high speed downlink packet access (HSDPA) technology, or the like.

The short range communicating module 114 indicates a module for short range communication. Possible short range communication technologies include but are not limited to a Bluetooth technology, a radio frequency identification (RFID) technology, an infrared data association (IrDA) technology, an ultra wideband (UWB) technology, a ZigBee technology, or the like.

In addition, the location information module 115 is a module which configures or obtains a location of the mobile terminal. A typical example of the location information module comprises a global positioning system (GPS) module, although other systems are possible without departing from the scope of the invention.

The A/V (audio/video) input unit 120, which is configured to input an audio signal or a video signal, may comprise a camera 121, a microphone 122, and the like. The camera 121 may process image frames including but not limited to a still image, a moving image, or the like, obtained by an image sensor in a video call mode, a photographing mode, or the like. In addition, the processed image frame may be displayed on a display unit 151.

The image frame processed in the camera 121 may be stored in the memory unit 160 or be transmitted to the outside through the wireless communicating unit 110. Two or more cameras 121 may also be provided according to a configuration aspect of the terminal.

The microphone 122 receives external sound signals in a call mode, a sound recording mode, a voice recognition mode, or the like, to process the sound signals to electrical audio data. Further, in the case of the call mode, the processed audio data may be converted in a form in which they may be transmitted to a mobile communication base station through the mobile communicating module 112 and then output. In the microphone 122, various noise removing algorithms which remove noise generated during a process of receiving the external sound signal may be implemented.

The user input unit 130 may be configured to allow the user to generate input data which controls an operation of the terminal. The user input unit 130 may comprise a keypad, a dome switch, a touch pad, a jog wheel, a jog switch, or the like. Particularly, when the touch pad forms a mutual layer structure together with the display unit 151, it may be called a touch screen.

The sensing unit 140 senses current states of the mobile terminal 100 such as an opened/closed state, a location, whether or not the user contacts the mobile terminal 100, a direction, an acceleration/deceleration, and the like, to sense sensing signals which control an operation of the mobile terminal 100. For example, when the mobile terminal 100 has a form of a slide phone, the sensing unit 140 may sense whether the slide phone is opened or closed. In addition, the sensing unit 140 is in charge of a sensing function related to whether or not power is supplied to the battery 190, whether or not an external device is coupled to the interface unit 170, or the like.

The output unit 150, which is configured to output an audio signal, a video signal, or an alarm signal, may comprise the display unit 151, a sound output module (for instance, an alarm unit) 152, and a vibrating module 153.

The display unit 151 displays and outputs information processed in the mobile terminal 100. For example, when the mobile terminal 100 is in the call mode, the display unit 151 displays a user interface (UI) or a graphic user interface (GUI) related to a call. Further, when the mobile terminal 100 is in the video call mode or the photographing mode, the display unit 151 displays a photographed and/or received image, the UI, or the GUI.

Meanwhile, as described above, when the display unit 151 and the touch pad form the mutual layer structure to configure the touch screen, the display unit 151 may be used as an input device as well as an output device. The display unit 151 may comprise at least one of a liquid crystal display, a thin film transistor-liquid crystal display, an organic light-emitting diode, a flexible display, and a three-dimensional (3D) display. In addition, the number of display units 151 may also be two or more according to an implementation of the mobile terminal 100.

The sound output module 152 outputs audio data received from the wireless communicating unit 110 or stored in the memory unit 160 in a call signal reception mode, a call mode, a sound recording mode, a voice recognition mode, a broadcasting reception mode, or the like. In addition, the sound output module 152 outputs a sound signal (for example, a call signal reception sound, a message reception sound, or the like) related to a function performed in the mobile terminal 100. The sound output module 152 may comprise a speaker, a buzzer, and the like.

The vibrating module 153 is a component configured to vibrate the mobile terminal under a control of the controlling unit at the time of generation of a vibration event of the mobile terminal. Examples of vibration events generated in the mobile terminal 100 include but are not limited to a call signal reception, a message reception, a key signal input, a touch input, or the like. When the call signal is received or the message is received, the vibrating module 153 may be operated in order to notify of the reception of the call signal or the message. Further, when the key signal is input, the vibrating module 153 may be operated as a feedback for the input of the key signal. At the time of the generation of the vibration event, the vibration event may also be output through both of the display unit 151 and the sound output module 152.

The memory unit 160 may store a program for the processing and controlling of the controlling unit 180, and may also store input/output data (for example, a phonebook, a message, a still image, a moving image, and the like). In addition, the memory unit 160 may store data related to various patterns of vibrations outputted at the time of a touch input on the touch screen, or various patterns of vibrations outputted at the time of generation of the call signal or the event.

The memory unit 160 may comprise at least one of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk, among other options. In addition, the mobile terminal 100 may also store data online using a web storage which functions in place of or in combination with a physically installed memory unit 160.

The interface unit 170 serves as an interface with all external devices connected to the mobile terminal 100. The interface unit 170 may comprise, for example, a wired/wireless headset port, an external charger port, a wired/wireless data port, a memory card port, a port for connection of a device comprising an identity module, an audio input/output (I/O) port, a video I/O port, an earphone port, and the like.

In addition, the controlling unit 180 may generally control the entire operation of the mobile terminal. For example, the controlling unit 180 performs controlling and processing related to a voice call, data communication, a video call, and the like. In addition, the controlling unit 180 may also comprise a multimedia module 181 for playing multimedia. The multimedia module 181 may be implemented in or separately from the controlling unit 180.

The battery 190 is applied with external power or internal power under a control of the controlling unit 180 to supply power required for an operation of each component. The battery 190 may be charged by receiving a wireless power signal from an external charger. That is, the battery 190 is charged by receiving a magnetic field generated in an originating coil installed in the external charger through a receiving coil (a wireless power receiving unit) installed in the mobile terminal side and again converting the magnetic field into electrical energy, using an electromagnetic induction principle. Alternatively, the battery 190 may be wirelessly charged even in a state in which it is spaced apart from the charger in a magnetic resonance scheme.

Various embodiments described herein may be implemented in a recording medium that is readable by a computer or a device similar to a computer using, for example, software, hardware, or a combination thereof.

With hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units which may perform functions. In some cases, these embodiments may be implemented by the controlling unit 180.

With software implementation, embodiments such as procedures or functions may be implemented together with separate software modules allowing at least one function or operation to be performed. A software code may be implemented by a software application written in an appropriate programming language. In addition, a software code may be stored in the memory unit 160 and be performed by the controlling unit 180.

Hereinafter, a method of changing a receiving mode in a mobile terminal, and a mobile terminal to which the method of changing a receiving mode is applied, according to an embodiment of the present invention, will be described in more detail with reference to FIGS. 2 to 5.

Figure 2:
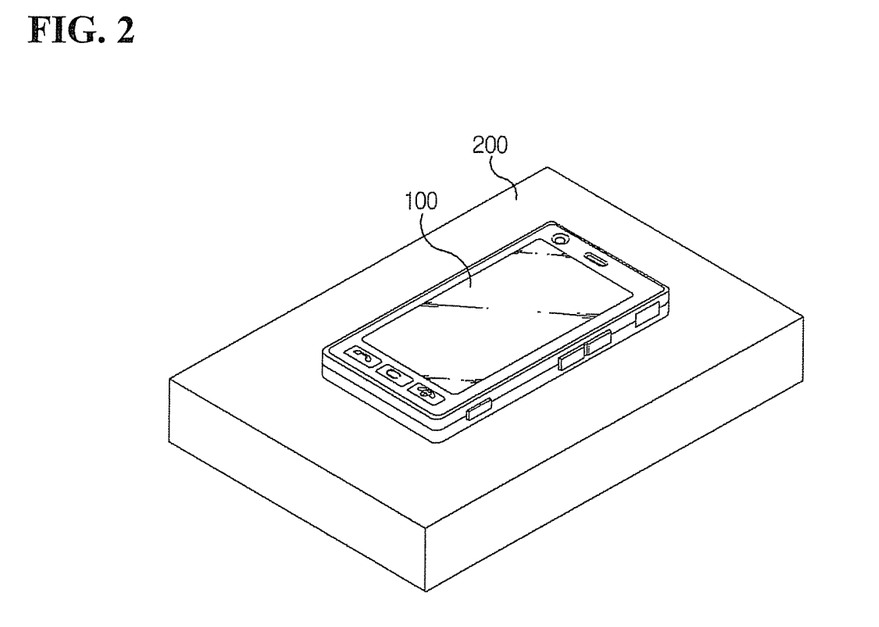
FIG. 2 is a diagram depicting a mobile terminal performing a method of changing a receiving mode in a mobile terminal, according to an embodiment of the present invention.

FIG. 2 is a diagram depicting a mobile terminal performing a method of changing a receiving mode in a mobile terminal, according to an embodiment of the present invention. As shown in the embodiment of FIG. 2, when an internal battery of the mobile terminal 100 is charged using a wireless charging system, the mobile terminal 100 is positioned adjacent to an external wireless power transmitting module 200. In this embodiment, a wireless power receiving unit installed in the mobile terminal 100 may receive a wireless power signal generated in a wireless power transmitting unit installed in the external wireless power transmitting module 200. This wireless power receiving unit charges the battery using the wireless power signal. The wireless charging system may employ electromagnetic induction, magnetic resonance, or the like.

Particularly, in the case of electromagnetic induction, the mobile terminal 100 needs to be accurately positioned at a charging location of the wireless power transmitting module 200. However, when the receiving mode of the mobile terminal 100 is a vibration mode, such that the mobile terminal 100 vibrates due to reception of a call signal, a text message, an event such as an alarm, or the like, the mobile terminal 100 being charged may shift from the charging location. In this case, a wireless transmission of the power may become less effective, such that the battery may not be sufficiently charged.

Further, when the battery is wirelessly charged using magnetic resonance, when the receiving mode of the mobile terminal 100 is the vibration mode, there is a risk that the mobile terminal 100 will shift out of a wireless charging critical distance (that is, a wireless charging possible distance).

The method of changing a receiving mode in a mobile terminal, and the mobile terminal to which the method of changing a receiving mode is applied, according to the embodiment of the present invention, will be described with reference to FIGS. 3 to 5.

Figure 3:
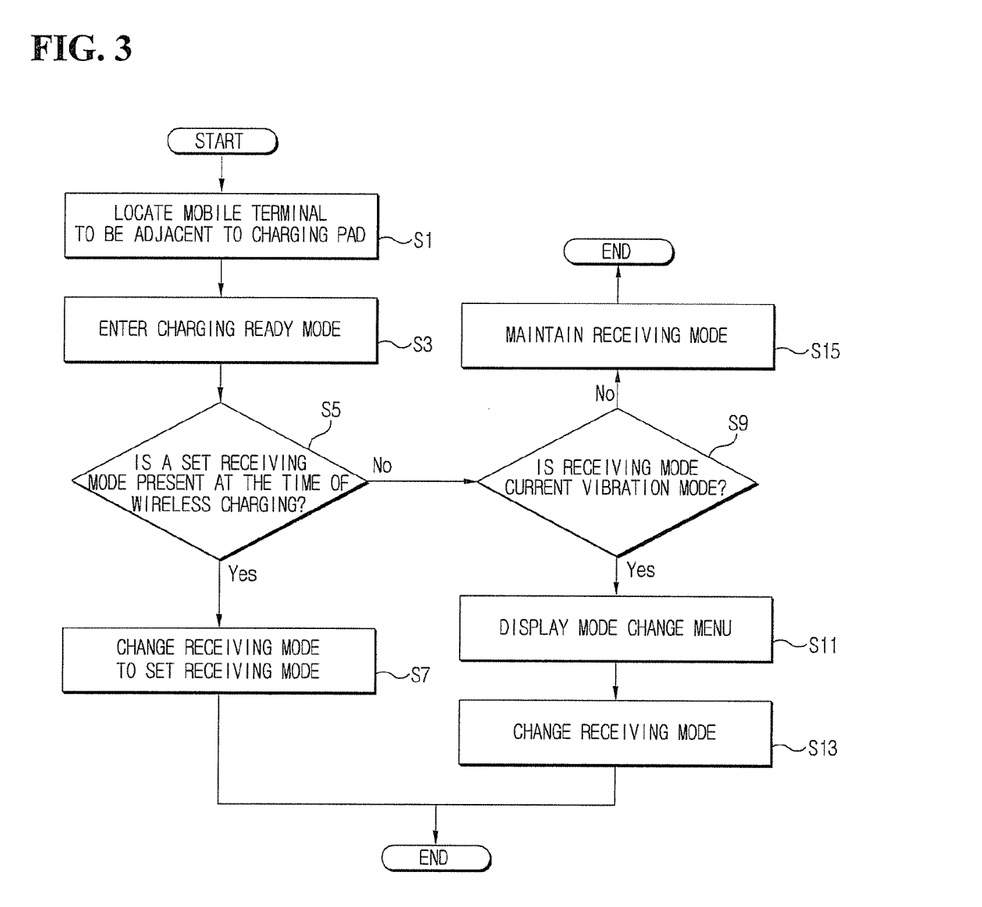
FIG. 3 is a flow chart describing the method of changing a receiving mode in a mobile terminal, according to an embodiment of the present invention.

FIG. 3 is a flow chart describing the method of changing a receiving mode in a mobile terminal, according to an embodiment of the present invention.

As shown in the embodiment depicted in FIG. 3, the mobile terminal is positioned adjacent to an external wireless power transmitting module (S1). That is, the mobile terminal is positioned to contact a charging location of the wireless power transmitting module or is positioned within a distance in which it may be charged from the wireless power transmitting module. In this case, a wireless power receiving unit of the mobile terminal recognizes the external wireless power transmitting module. Therefore, the controlling unit allows the mobile terminal to enter a charging ready mode (S3). In the depicted embodiment, the charging ready mode is a concept comprising being ready to perform the charging of the battery, and/or initiating the charging of the battery.

Next, the controlling unit determines whether there is a preset receiving mode at the time of wireless charging (S5). If the user, using a terminal setting menu before charging, has preset the receiving mode at the time of the wireless charging, the controlling unit changes the receiving mode of the mobile terminal to the preset receiving mode (S7).

However, when there is no preset receiving mode at the time of the wireless charging, the controlling unit determines whether a current receiving mode is a vibration mode (S9). In such a case, the vibration mode comprises a mode of operating the vibrating module at the time of generation of an event, which may include but is not limited to a vibration-sound mode, a post-vibration sound mode, a post-sound vibration mode, or the like. When the current receiving mode is the vibration mode, the vibration mode may be automatically changed into a non-vibration mode. Alternatively, as in the embodiment shown in FIG. 3, the controlling unit may display a mode change menu on a display unit (S11). In this case, the controlling unit may operate the sound output module or the vibrating module to inform the user that the current receiving mode is the vibration mode.

Here, remaining receiving mode list items other than the vibration mode may be displayed in the mode change menu. That is, a silent mode list item, a sound mode list item, and the like, may be displayed. When the user selects a specific non-vibration mode through the mode change menu, the controlling unit changes the receiving mode of the mobile terminal to the non-vibration mode (S13). In some embodiments, after a predetermined time elapses, the receiving mode of the mobile terminal may be automatically changed to the non-vibration mode if the user does not select a mode. At this time, an alarm unit may notify the user that the receiving mode of the mobile terminal has been changed to the non-vibration mode.

Meanwhile, when the current receiving mode is not the vibration mode, the controlling unit maintains the current receiving mode as it is (S15). As described above, in the non-vibration mode state, the battery of the mobile terminal is charged.

When the charging is completed, the receiving mode changed to the non-vibration mode may be reset to an original vibration mode.

According to the embodiment of the present invention having the above-mentioned configuration, when the mobile terminal performs the wireless charging, even though the event is generated, the mobile terminal may effectively perform the wireless charging.

In addition, an opportunity to change the receiving mode at the time of the wireless charging is given to the user, such that the user may rapidly change the receiving mode as needed.

Hereinafter, the present invention will be described in more detail with reference to image diagrams of the mobile terminal in which the method of changing a receiving mode in a mobile terminal according to the embodiment of the present invention is applied.

Figure 4:
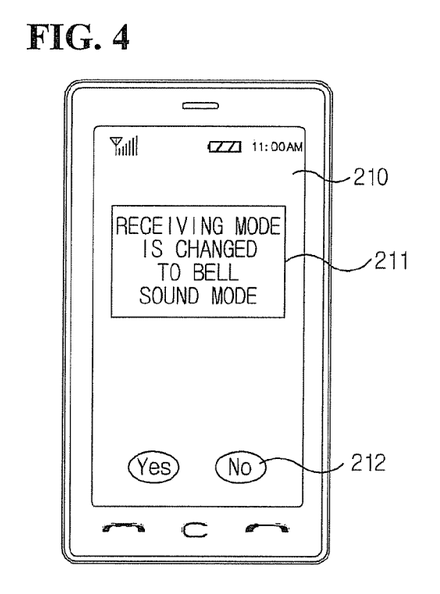
FIGS. 4 and 5 are image diagrams of a mobile terminal performing the method of changing a receiving mode in a mobile terminal in a first example situation, according to an embodiment of the present invention.
Figure 5:
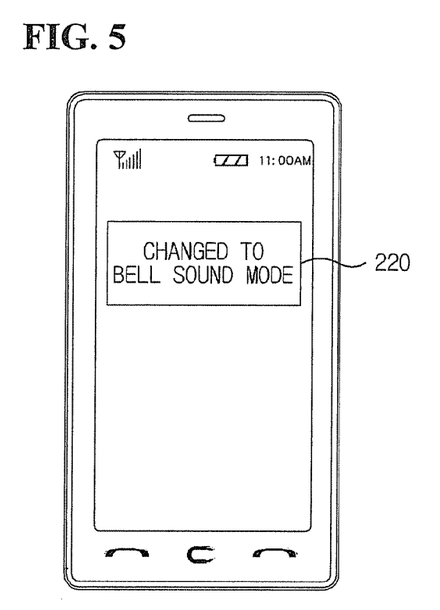

FIGS. 4 and 5 are image diagrams of a mobile terminal performing the method of changing a receiving mode in a mobile terminal in a first example situation. according to an embodiment of the present invention. The first example of FIGS. 4 and 5 corresponds to a case in which the receiving mode is preset at the time of the wireless charging.

In the embodiment depicted in FIG. 4, a receiving mode changing screen 210 is displayed on the display unit 151 when the mobile terminal 100 is first positioned at the charging location of the wireless power transmitting module 200. That is, when the user positions the mobile terminal 100 on the wireless power transmitting module 200, the controlling unit senses that the mobile terminal 100 has been positioned on the wireless power transmitting module 200, and displays the receiving mode changing message 211 on the display unit.

The receiving mode changing screen 210 may comprise a receiving mode changing message 211, stating that the receiving mode is automatically changing to a preset receiving mode (here, a bell sound mode), and icons such as a No icon 212. Here, if the user selects the No icon 212, a current receiving mode is maintained without being changed. However, if any input signal is not generated for a predetermined time, the controlling unit changes the receiving mode of the mobile terminal 100 to the bell sound mode, which is the non-vibration mode, while a receiving mode change message 220 is displayed on the display unit 151, as shown in FIG. 5.

Although, in the above example and embodiment, the receiving mode changing screen 210 is displayed in consideration of an option of the user, in other embodiments, no receiving mode changing screen 210 is displayed, and the receiving mode is directly changed to the preset receiving mode. In a subset of such embodiments, the receiving mode change message 120 may still be displayed on the display unit 151.

In other embodiments, either message 211 or 220 may also be outputted through the sound output module.

According to the embodiment of the present invention described above, even though the call signal is received or the alarm function is operated during charging, since the vibrating module is not operated, the battery may be stably charged.

Figure 6:
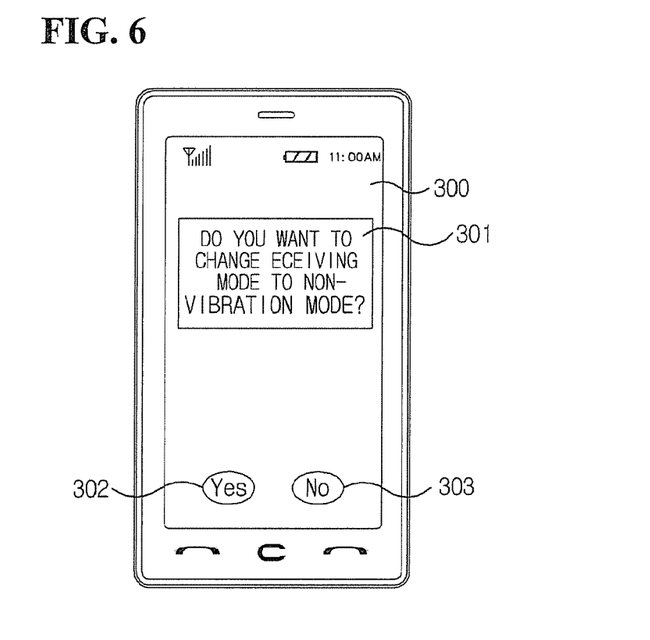
FIGS. 6 through 8 are image diagrams of a mobile terminal performing the method of changing a receiving mode in a mobile terminal in a second example situation, according to an embodiment of the present invention.
Figure 7:
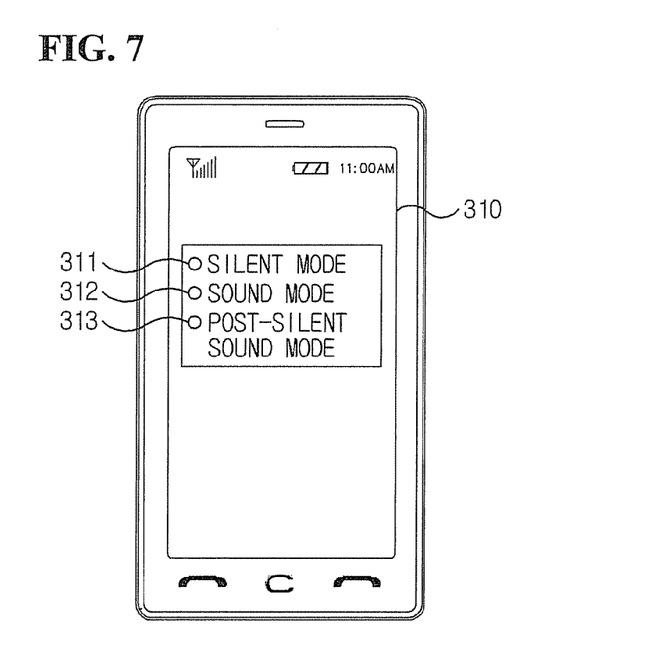
Figure 8:
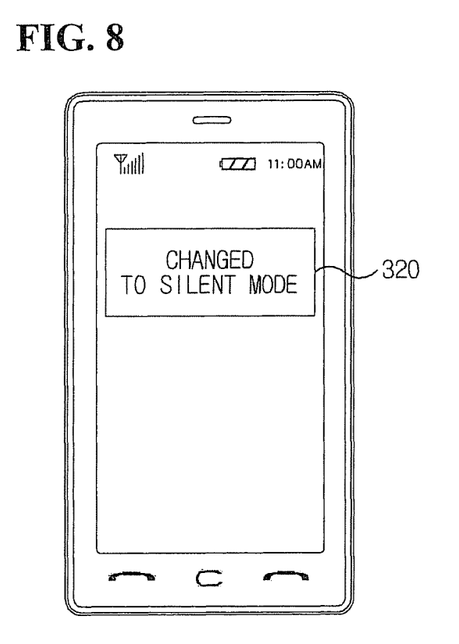

FIGS. 6 to 8 are image diagrams of a mobile terminal performing the method of changing a receiving mode in a mobile terminal in a second example situation, according to an embodiment of the present invention. The second example corresponds to a case in which the receiving mode is not preset at the time of the wireless charging.

In the embodiment depicted in FIG. 6, a mode change menu screen 300 is displayed on the display unit 151 when the mobile terminal 100 is first positioned at the charging location of the wireless power transmitting module 200. The mode change menu screen 300 may comprise an inquire message 301, a Yes icon 302, and a No icon 303. Here, if the user selects the No icon 303, the current receiving mode is maintained as it is. However, if the user selects the Yes icon 302, as shown in FIG. 7, a receiving mode list 310 is displayed on the display unit 151. The receiving mode list 310 may comprise one or more of a silent mode list item 311, a sound mode list item 312, and a post-silent sound mode list item 313, but not a vibration mode list item. Here, when the user selects one of the items of the list 310 (in the depicted example, the silent mode list item 311), the controlling unit changes the receiving mode to the silent mode accordingly and displays a receiving mode change confirmation message 320 informing the user that the receiving mode has been changed to the silent mode on the display unit, as depicted in FIG. 8). Therefore, even though the call signal is received or the alarm function is operated during charging, since the vibrating module is not operated, the battery may be stably charged.

In the method of changing a receiving mode in a mobile terminal, and the mobile terminal to which the method of changing a receiving mode is applied, as described above, the configuration and the method of the above-described embodiments are not restrictively applied. That is, all or some of the respective embodiments may be selectively combined with each other so that they may be variously modified. It will also be appreciated by those skilled in the art that further changes may be made in this embodiment without departing from the principles and spirit of the invention, the scope of which is defined in the claims and their equivalents.

The invention claimed is:

1. A method of changing a receiving mode in a mobile terminal, the method comprising:
   recognizing an external wireless power transmitting module by receiving a wireless power signal;
   determining whether a wireless charge setup receiving mode exists on the receiving mode of the mobile terminal;
   maintaining the setup receiving mode if the wireless charge setup receiving mode exists and confirming whether the receiving mode of the mobile terminal is a vibration mode, if the wireless charge setup receiving mode does not exist;
   changing the receiving mode of the mobile terminal from the vibration mode to a non-vibration mode if the wireless charge setup receiving mode does not exist and the receiving mode of the mobile terminal is the vibration mode, wherein the changing the receiving mode of the mobile terminal from the vibration mode to the non-vibration mode comprises:

informing a user that the current receiving mode is the vibration mode by a sound output or a vibration;

displaying a mode change menu on a display unit, wherein the mode change menu comprising remaining receiving mode list items other than the vibration mode; and changing the receiving mode of the mobile terminal from the vibration mode to the non-vibration mode selected by the user.

2. The method of claim 1, wherein the step of changing the receiving mode of the mobile terminal from the vibration mode to the non-vibration mode comprises:

presetting the non-vibration mode; and when the receiving mode of the mobile terminal is the vibration mode, automatically changing the receiving mode of the mobile terminal to the preset non-vibration mode.

3. The method of claim 1, wherein the non-vibration mode comprises any one of a silent mode, a sound mode, and a post-silent sound mode.

4. The method of claim 1, further comprising performing an alarm function when the receiving mode of the mobile terminal is the vibration mode.

5. The method of claim 1, further comprising changing the receiving mode of the mobile terminal to the vibration mode when a battery of the mobile terminal is fully charged.

6. A mobile terminal comprising:

a wireless charging receiving module configured to receive a wireless power signal through an external wireless power transmitting module;

a battery charged by the wireless power signal received through the wireless charging receiving module;

a vibrating module configured to give a vibration to the mobile terminal when an event occurs;

a controlling unit configured to: recognize the external wireless power transmitting module by receiving the wireless power signal; enter a charging ready mode capable of receiving the wireless power signal from the external wireless power transmitting module if the wireless power signal is able to be received as the wireless charging receiving module of the mobile terminal is located within a charge capable distance from the external wireless power transmitting module; determine whether a wireless charge setup receiving mode exists on the receiving mode of the mobile terminal; maintain the setup receiving mode if the wireless charge setup receiving mode exists; confirm whether the receiving mode of the mobile terminal is a vibration mode if the wireless charge setup receiving mode does not exist; and change the receiving mode of the mobile terminal from the vibration mode to a non-vibration mode if the wireless charge setup receiving mode does not exist and the receiving mode of the mobile terminal is the vibration mode;

a display unit configured to display a mode change menu comprising remaining receiving mode list items other than the vibration mode if the wireless charge setup receiving mode does not exist and the receiving mode of the mobile terminal is the vibration mode, and a user input unit configured to preset the non-vibration mode;

wherein the controlling unit changes the receiving mode of the mobile terminal from the vibration mode to the non-vibration mode selected through the user input unit among the remaining receiving mode list items other than the vibration mode displayed on the display unit.

7. The mobile terminal of claim 6, wherein the non-vibration mode comprises any one of a silent mode, a sound mode, and a post-silent sound mode.

8. The mobile terminal of claim 6, further comprising an alarm unit, wherein the controlling unit operates the alarm unit when the wireless charging receiving module is positioned adjacent to the external wireless power transmitting module and the receiving mode is the vibration mode.

9. The mobile terminal of claim 6, wherein the controlling unit resets the receiving mode of the mobile terminal to the vibration mode when a battery of the mobile terminal is fully charged.

* * * * *